United States Patent
Trojer et al.

(10) Patent No.: US 9,948,004 B2
(45) Date of Patent: Apr. 17, 2018

(54) HYBRID COIL CIRCUIT

(71) Applicant: Telefonaktiebolaget LM Ericsson (publ), Stockholm (SE)

(72) Inventors: Elmar Trojer, Täby (SE); Per-Erik Eriksson, Stockholm (SE); Chenguang Lu, Sollentuna (SE); Lukas Sandström, Göteborg (SE); Miguel Berg, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/318,288

(22) PCT Filed: Jul. 1, 2014

(86) PCT No.: PCT/SE2014/050822
§ 371 (c)(1),
(2) Date: Dec. 12, 2016

(87) PCT Pub. No.: WO2016/003331
PCT Pub. Date: Jan. 7, 2016

(65) Prior Publication Data
US 2017/0125902 A1    May 4, 2017

(51) Int. Cl.
*H01Q 7/00* (2006.01)
*H01Q 1/48* (2006.01)
(Continued)

(52) U.S. Cl.
CPC ............... *H01Q 7/00* (2013.01); *H01Q 1/48* (2013.01); *H01Q 5/335* (2015.01); *H04B 1/58* (2013.01);
(Continued)

(58) Field of Classification Search
CPC . H01Q 7/00; H01Q 1/48; H01Q 5/335; H04B 3/20; H04B 3/28; H04B 3/30; H04B 1/58
See application file for complete search history.

(56) References Cited

U.S. PATENT DOCUMENTS 2,169,360 A    8/1939  Kimmel
2007/0297201 A1*  12/2007  Lee ................... H04L 25/0266
                                                363/21.06
(Continued)

FOREIGN PATENT DOCUMENTS

FR    2 515 903 A1    5/1983
GB    2 021 362 A    11/1979

OTHER PUBLICATIONS

International Search Report, International Application No. PCT/SE2014/050822, dated Mar. 31, 2015.
(Continued)

*Primary Examiner* — Hoang Nguyen
(74) *Attorney, Agent, or Firm* — Sage Patent Group

(57) ABSTRACT

It is presented a hybrid coil circuit comprising: a transformer; a common mode choke, wherein all choke windings are magnetically coupled; an impedance matching device connected on a middle choke winding, the impedance matching device being connected to ground; a first port being provided between a first choke winding and the impedance matching device; a second port being provided between a third choke winding and the impedance matching device; a third port being provided between either end of a second transformer winding; a first inductor arranged between the impedance matching device and the first port; and a second inductor arranged between the impedance matching device and the second port, wherein the first inductor and the second inductor are magnetically coupled.

10 Claims, 4 Drawing Sheets

(51) Int. Cl.
    *H01Q 5/335*     (2015.01)
    *H04B 3/28*     (2006.01)
    *H04B 3/30*     (2006.01)
    *H04B 3/20*     (2006.01)
    *H04B 1/58*     (2006.01)

(52) U.S. Cl.
    CPC ................ *H04B 3/20* (2013.01); *H04B 3/28* (2013.01); *H04B 3/30* (2013.01)

(56) References Cited

U.S. PATENT DOCUMENTS

| | | | | |
|---|---|---|---|---|
| 2011/0304411 A1* | 12/2011 | Zhang | ............... | H03H 7/09 |
| | | | | 333/177 |
| 2012/0063173 A1* | 3/2012 | Fu | ..................... | H02M 3/28 |
| | | | | 363/21.02 |

OTHER PUBLICATIONS

Written Opinion o f the International Searching Authority, International Application No. PCT/SE2014/050822, dated Mar. 31, 2015.

* cited by examiner

HYBRID COIL CIRCUIT

CROSS REFERENCE TO RELATED APPLICATION

This application is a 35 U.S.C. § 371 national stage application of PCT International Application No. PCT/SE2014/050822, filed on Jul. 1, 2004, the disclosure and content of which is incorporated by reference herein in its entirety. The above-referenced PCT International Application was published in the English language as International Publication No. WO 2016/003331 A1 on Jan. 7, 2016.

TECHNICAL FIELD

The invention relates to a hybrid coil circuit, remote radio head and network interface.

BACKGROUND

In many communication systems, there is a need to share a communications medium between transmit and receive signals. In e.g. analogue telephony systems, this is known as 4-wire to 2-wire conversion (or vice versa) since the shared medium (twisted pair), has two wires and transmit and receive signals have two wires each.

Typically, there is a need to achieve isolation between transmit and receive paths so that the transmit signal does not reach the receiver input with full strength. This is referred to as near-end echo cancellation. The degree of isolation between transmitter and receiver can be denoted Trans-Hybrid Return Loss (THRL). Here, we define THRL as the ratio between transmitter-receiver loss and the insertion loss from transmitter to line. The functionality can be implemented in different ways, e.g. by using a hybrid coil (also known as a hybrid transformer). Other types of hybrid circuits, e.g. using resistive bridges, are common in e.g. Digital Subscriber Line (DSL) modems. Resistive bridges are cheaper and typically require smaller space on the circuit boards but usually have high loss in at least one direction and they also make it difficult to achieve low noise levels, due to thermal noise in the resistors.

A dual core hybrid coil can be designed to support wide bandwidth but it requires two transformers connected towards the 2-wire side (shared medium). Also, the transformers need to have two separate secondary windings, i.e. a winding with a centre tap is not sufficient. These restrictions lead to high cost and large space requirements, especially if the shared medium has high voltage isolation requirements.

A single core hybrid coil is less complex than the dual core hybrid coil, but it is difficult to achieve high isolation between transmit and receive ports over a wide bandwidth, mainly due to non-ideal properties of the transformer. Some transformer imperfections can be compensated for by modifying a impedance matching device.

For applications with high requirements regarding e.g. common-mode rejection and, it is not always sufficient to use just a transformer as interface between the transceiver and the transmission medium (hereafter called "line") but a common-mode choke may be needed as well. This is typically seen for Local Area Network (LAN) applications such as 1000BASE-T (gigabit Ethernet) and 10 GBASE-T (10 gigabit Ethernet) where such a choke is used in conjunction with the transformer.

Such devices are available with high bandwidth, good return loss, low insertion loss, and high CMRR. However, even if return loss is very good in normal operation, the choke can cause problems when the device is used as a hybrid coil; if the leakage inductance of the choke is sufficiently high, a negative inductance is needed in the impedance matching device in order to cancel the leakage inductance of the choke, since the leakage inductance of the choke will end up in series with the balance impedance. However, implementing a negative inductance in a one- or two-terminal device requires active components, which typically adds cost, complexity, and noise.

SUMMARY

According to a first aspect, it is presented a hybrid coil circuit comprising: a transformer comprising a first transformer winding and a second transformer winding, wherein a first centre tap is arranged on the first transformer winding; a common mode choke comprising a first choke winding connected on its first side to a first end of the first transformer winding, a second choke winding connected on its first side to the first centre tap and a third choke winding connected on its first side to a second end of the first transformer winding, wherein all choke windings are magnetically coupled; an impedance matching device connected on a first end to a second side of the second choke winding, the impedance matching device being connected to ground; a first terminal of a first port being provided connected to a second side of the first choke winding; a second terminal of the first port being provided connected to a second end of the impedance matching device; a first terminal of a second port being provided connected to a second side of the third choke winding; a second terminal of the second port being provided connected to a second end of the impedance matching device; a third port being provided with respective terminals connected to either end of the second transformer winding; a first inductor arranged between the second end of the impedance matching device and the second terminal of the first port; and a second inductor arranged between the second end of the impedance matching device and the second terminal of the second port, wherein the first inductor and the second inductor are magnetically coupled.

By using an appropriately dimensioned mutual inductance of the first inductor and second inductor, there is no need to provide any negative inductance in the impedance matching device. This is a great improvement over the prior art whereby better trans-hybrid return loss is achieved over a relatively large frequency span. Moreover, this is achieved using simple components.

The magnetic coupling of the first inductor and second inductor may comprise a first common magnetic core.

The magnetic coupling of all choke windings may comprise a second common magnetic core.

The hybrid coil circuit may further comprise: a first capacitor arranged between the first inductor and the second side of the first choke winding; and a second capacitor arranged between the second inductor and the second side of the third choke winding.

The hybrid coil circuit may further comprise: a third inductor arranged between the second terminal of the first port and the second terminal of the second port.

The impedance matching device may comprise a resistor in parallel with a capacitor.

The hybrid coil circuit may further comprise a first port transformer connected on the first port and a second port transformer connected on the second port.

The hybrid coil circuit may further comprise: a second centre tap is arranged on the second transformer winding, wherein the second centre tap is connected to ground.

According to a second aspect, it is provided a remote radio head comprising a hybrid coil circuit according to the first aspect, wherein the hybrid coil circuit is arranged such that its third port is connected to a port of the remote radio head for connection to a network node, its first port is connected to a receiver of the remote radio head and its second port is connected to a transmitter of the remote radio head.

According to a third aspect, it is provided a network interface comprising a hybrid coil circuit according to the first aspect, wherein the hybrid coil circuit is arranged such that its third port is connected to a network port of the network interface, its first port is connected to a receiver of the network interface and its second port is connected to a transmitter of the network interface.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
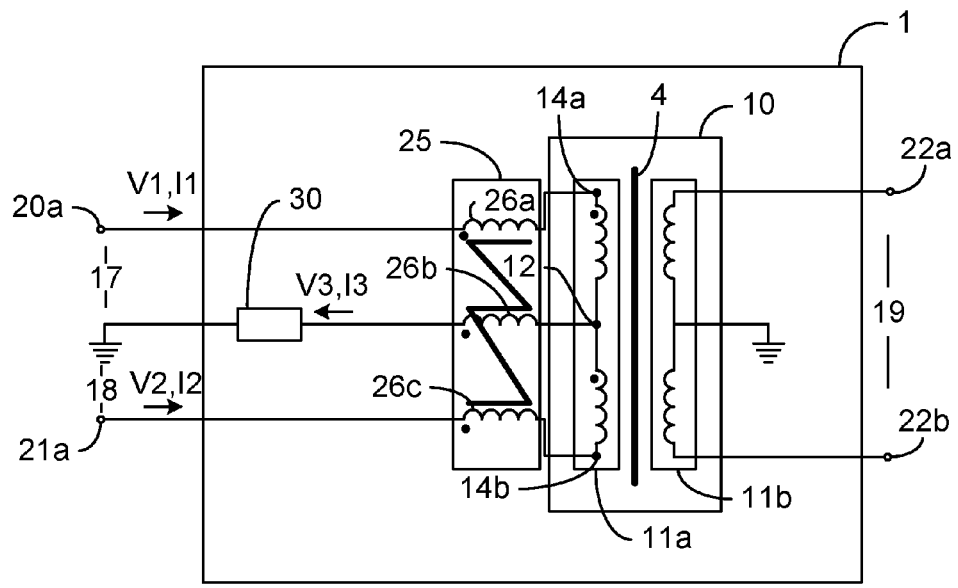
FIG. 1 is a schematic circuit diagram of a hybrid coil circuit substantially of the prior art.

FIG. 1 is a schematic circuit diagram of a hybrid coil circuit 1 substantially of the prior art. It is to be noted that while the principles described are known from the prior art, all components of FIG. 1 may or may not be available in a hybrid coil circuit of the prior art. Hence, the hybrid coil circuit is not admitted to form part of the prior art. The hybrid coil circuit has a first port 17 and a second port 18 which can be connected to transmission and reception, respectively. It is not important which of the first port 17 and the second port 18 is connected to transmission and reception, respectively. On the other side of the hybrid coil circuit 1, a third port 19 is provided to be connected to a common medium used for both transmission and reception.

A transformer 10 comprises a first transformer winding 11a and a second transformer winding 11b, where either one of these windings can be the primary winding and the other winding is a secondary winding. However, in this example, the first winding is the primary winding and the second winding is the secondary winding. A first centre tap 12 is arranged on the first transformer winding 11a.

A common mode choke 25 is provided which comprises a first choke winding 26a, a second choke winding 26b and a third choke winding 26c. The first choke winding 26a is connected on its first side to a first end 14a of the first transformer winding 11a and on its second end to a first terminal 20a of the first port 17. The second choke winding 26b is connected on its first side to the first centre tap 12 and on it second end to an impedance matching device 30. The third choke winding 26c is connected on its first side to a second end 14b of the first transformer winding 11a and on its second end to a first terminal 21a of the second port 18. All three choke windings 26a-c are magnetically coupled (e.g. using a common magnetic core 27) to in this way achieve common mode rejection, i.e. to remove or at least reduce interference or noise present on the third port 19, e.g. from the line connected to the third port 19.

The impedance matching device 30 is also connected to ground. The impedance of the impedance matching device is denoted Z1. The third port 19 is provided with respective terminals 22a-b connected to either end of the second transformer winding 11b. The impedance on the third port 19 is denoted Z0.

Ignoring first the common mode choke 25, the operation of the hybrid coil circuit 1 will now be described. The first port 17 is the transmit port and the second port 18 is the receive port although the hybrid is symmetric so they could be interchanged. Both ports are referenced to ground, i.e. unbalanced. The third port 19 is on the other side of the transformer 10 and could be connected either balanced (as in the figure) e.g. to a twisted-pair cable, or unbalanced, e.g. to a coaxial cable.

In receive operation, a signal is assumed to come from the third port 19 (cable or other source). Assuming perfect common-mode rejection in the transformer 10, this will result in equal magnitude but opposite phase signals on either end 14a-b of the first transformer winding 11a, i.e. the transformer 10 acts as a power splitter, causing 3 dB reduction of received signal power into the second port 18. The voltage on the centre tap 12 of the transformer 10 (and the impedance matching device 30) is zero.

Now, the transmit operation will be described. Since the first port 17 and the second port 18 are ground referenced, the condition for perfect isolation (infinite THRL) between transmission and reception is that the voltage V3 on the lower end of the first transformer winding 11a should be zero, independent of the voltage V1 on the upper end of the transformer winding (all voltages are with respect to ground potential). If the two halves of the first winding 11a are equal, this further requires that $V3=(V1+V2)/2=V1/2$. Now, if $V2=0$, there can be no current going through the lower end of the first transformer winding 14b. This means that in order to get $V3=V1/2$, the impedance matching device 30 has to have an impedance Z1 which is equal to the impedance seen in the upper half of the first winding 11a (between the upper end 14a and the centre tap 12). Since the upper half of the first winding 11*a* has half the number of turns compared with the whole second winding 11*b*, and since the load on the secondary side is Z0, the impedance seen between the upper end 14*a* and the centre tap 12 will be (Z0/2^2)=Z0/4. Thus, the hybrid coil circuit 1 in FIG. 1 is perfectly balanced and will, in theory, have infinite THRL.

A more detailed theoretical analysis of the hybrid coil circuit of FIG. 1 will now be presented. In the following analysis, transformers and chokes are modeled as ideal components, but with an inductance in series with each winding in order to represent leakage inductance. This analysis neither takes into account the transmission line effects of windings at high frequencies nor the effect of insufficient self-inductance at low frequencies, but it is sufficient to illustrate the problem of the circuit of FIG. 1.

The common mode choke 25 is assumed to have a leakage inductance Lc in each choke winding 26*a-c* while the primary and secondary sides of the transformer 10 are assumed to have leakage inductances Lp and Ls respectively in each half of the primary and secondary winding. In this analysis, the first port 17 is assumed to be used for transmission and the second port 18 is assumed to be used for reception, but the same analysis is applicable for the opposite.

Voltages are referenced to ground and denoted with V1, V2, V3 while currents are denoted I1, I2, I3.

$$V2=0, I2=0 \quad (1)$$

Equations (1) are conditions for infinite Tx (transmission)–Rx (reception) isolation (balance condition)

The balance condition gives:

$$I3=I1 \quad (2)$$

The input impedance Zin1 of the hybrid seen from the first port 17 becomes:

$$Zin1 = \frac{V1}{I1} = j\omega Lc + j\omega Lp + \frac{Z0 + 2j\omega Ls}{4} + j\omega Lc + Z1 = \quad (3)$$

$$j\omega\left(2Lc + Lp + \frac{Ls}{2}\right) + \frac{Z0}{4} + Z1$$

Furthermore, from the balance condition and the leakage inductances, we get $$V3 = \frac{(V1 - I1 j\omega Lc - I1 j\omega Lp)}{2} - I1 j\omega Lc, \text{ and} \quad (4)$$

$$Z1 = \frac{V3}{I3} = \frac{V3}{I1} = \frac{1}{2}\left(\frac{V1}{I1} - 3j\omega Lc - j\omega Lp\right) \quad (5)$$

Inserting the expression for Z in (3) from above gives $$Z1 = \frac{1}{2}\left(j\omega\left(2Lc + Lp + \frac{Ls}{2}\right) + \frac{Z0}{4} + Z1 - 3j\omega Lc - j\omega Lp\right) = \quad (6)$$

$$= \frac{1}{2}\left(j\omega\left(-Lc + \frac{Ls}{2}\right) + \frac{Z0}{4} + Z1\right)$$

Which after manipulation yields $$Z1 = j\omega\left(-Lc + \frac{Ls}{2}\right) + \frac{Z0}{4} \quad (7)$$

It can be observed in (7) that if the leakage inductance of the choke, Lc, is large enough (greater than Ls/2), the impedance needed for infinite isolation, Z1, will contain a negative inductance term for the imaginary part. It can also be noted that the leakage inductance of the primary winding, Lp, disappeared from the expression and thus does not affect the hybrid's isolation.

From the expression (7), it seems like it would be possible to solve the issue by adding inductance in series with the load Z0. In practice, this only works partially since the expression above is too simplified and does not take into account the transmission line effect of the transformer 10. The main problem is that the correction is then performed on the wrong side of the line transformer 10. Since that transformer 10 typically has a large number of turns, it will act like a transmission line transformer and change the impedance for anything that deviates from the design impedance (typically 100 ohm). High frequencies will experience larger changes.

While it may be possible to manufacture a transformer that allows zero or positive inductance in Z1, e.g. by increasing Ls or decreasing Lc, such a part may need custom manufacturing and may not be suitable for certain other applications since such modification may affect e.g. return loss and common mode rejection. A custom part is more expensive than a standard component. Also, the analysis above is likely too simplified to serve as basis for a redesigned line transformer due to the idealized modeling approach.

Figure 2:
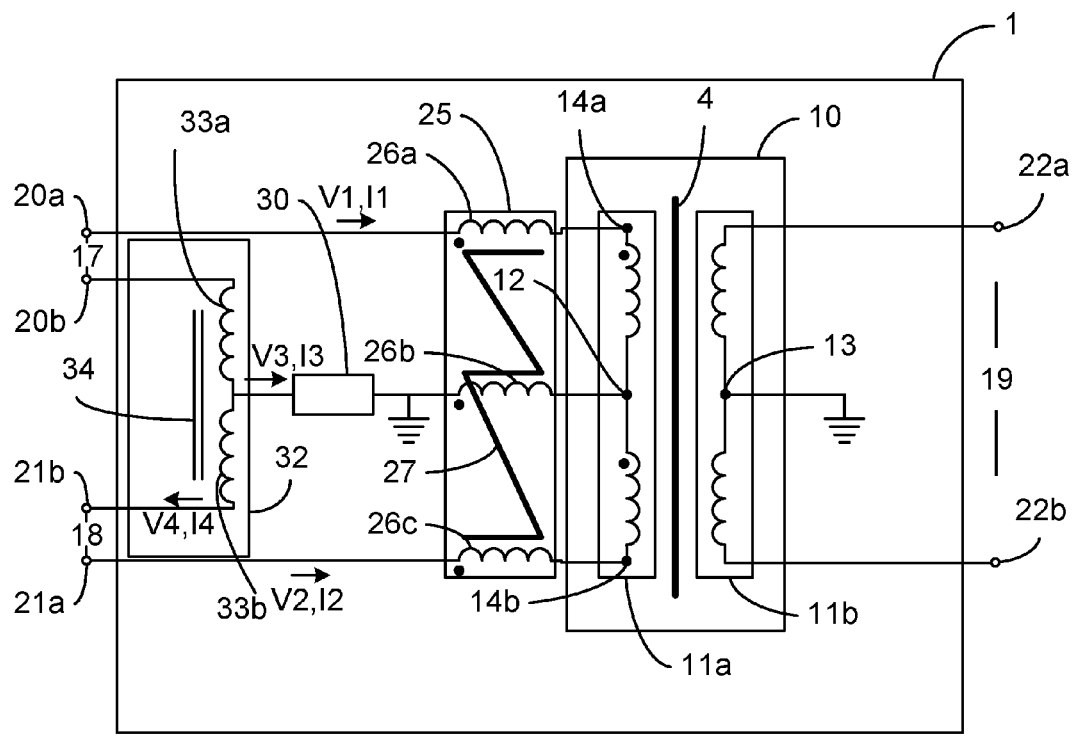
FIG. 2 is a schematic circuit diagram of a hybrid coil circuit according to one embodiment.

FIG. 2 is a schematic circuit diagram of a hybrid coil circuit according to one embodiment. Many of the components are equivalent to those described above with reference to FIG. 1 and will not be explained again.

Here, a first inductor 33*a* is provided between the second end of the impedance matching device 30 and the second terminal 10*b* of the first port 17. Moreover, a second inductor 33*b* is provided between the second end of the impedance matching device 30 and the second terminal 21*b* of the second port 18. The first inductor 33*a* and the second inductor 33*b* are magnetically coupled, making up a coupled inductor 32. The coupled inductor 32 has a first common magnetic core 34.

By adding the coupled inductor 32 and thereby splitting the ground on the primary side of the transformer 10, the first port 17 and the second port 18 are semi-differential instead of single ended. The first port 17 and the second port 18 are here called semi-differential since they no longer share a common ground. The coupled inductor 32 then changes the ground reference for the Tx and Rx ports in order to compensate for the leakage inductance in the common mode choke 25. Another difference between the embodiment of FIG. 2 and the prior art is that the ground connection is moved to the center tap of the common mode choke 25. This is not strictly necessary but improves the common mode rejection performance since the transformer 10 will then have no or very little common mode signal applied. Typically, this will improve electromagnetic compatibility (EMC).

A theoretical analysis of the hybrid coil circuit of FIG. 2 will now be presented, with similar assumptions as in the prior art analysis regarding modeling of chokes and transformer. The coupled inductor 32 is modeled using its mutual inductance Lm since it will be of similar magnitude as the leakage inductance in the transformer 10 and since the leakage inductance in the coupled inductor 32 will be much smaller than the other leakage inductances. In this analysis, the first port 17 is assumed to be used for transmission and the second port 18 is assumed to be used for reception, but the same analysis is applicable for the opposite.

$$V2=V4, I2=0 \quad (8)$$

Equations (8) are conditions for infinite Tx–Rx isolation assuming infinite common mode impedance at the first and second ports 17, 18.

The balance condition gives:

$$I3=I1, I4=0 \quad (9)$$

The input impedance Zin1p of the hybrid seen from the upper half of the first port 17 becomes:

$$Zin1p = \frac{V1}{I1} = j\omega Lc + j\omega Lp + \frac{Z0 + 2j\omega Ls}{4} \quad (10)$$
$$= j\omega\left(Lc + Lp + \frac{Ls}{2}\right) + \frac{Z0}{4}$$

Furthermore, from the balance condition and the leakage inductances, we get $$V4 = V2 = -(V1 - I1\,j\omega Lc - I1\,j\omega Lp) + 2I1\,j\omega Lc = \quad (11)$$
$$= 3I1\,j\omega Lc + I1\,j\omega Lp - V1$$

Further, we have that $$V4=V3-I3 \cdot j\omega Lm \leftrightarrow V3=V4+I3 \cdot j\omega Lm = V4-I1 \cdot j\omega Lm \quad (12)$$

and that $$Z1 = \frac{V3}{I3} = \frac{V3}{I1} \leftrightarrow Z1 = -\frac{V3}{I1}. \quad (13)$$

Combining the above three formulas gives $$Z1 = -\frac{V4}{I1} + j\omega Lm = -3j\omega Lc - j\omega Lp + \frac{V1}{I1} + j\omega Lm \quad (14)$$

Inserting the expression for Zin1p yields:

$$Z1 = -3j\omega Lc - j\omega Lp + j\omega\left(Lc + Lp + \frac{Ls}{2}\right) + \frac{Z0}{4} + j\omega Lm \quad (15)$$

Thus, the impedance Z1 for infinite isolation becomes $$Z1 = \frac{Z0}{4} + j\omega\left(-2Lc + \frac{Ls}{2} + Lm\right) \quad (16)$$

Here, we see that we can compensate for the negative inductance by selecting a mutual inductance for component the coupled inductor 32 according to $$Lm = 2Lc - \frac{Ls}{2} \quad (17)$$

In other words, by using an appropriately dimensioned mutual inductance Lm between the second terminals 20b, 21b of the first port 17 and the second port 18, there is no need to provide any negative inductance in the impedance matching device 30.

Figure 3:
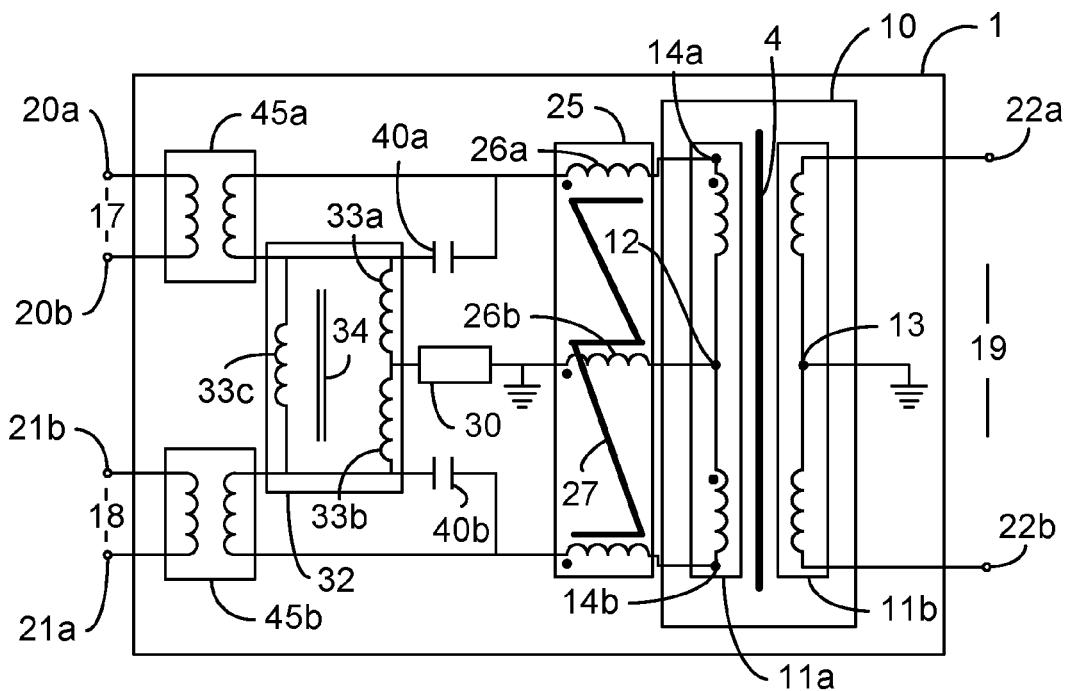
FIG. 3 is a schematic circuit diagram of a hybrid coil circuit according to one embodiment.

FIG. 3 is a schematic circuit diagram of a hybrid coil circuit according to one embodiment. Many of the components are equivalent to those described above with reference to FIG. 2 and will not be explained again.

Here, an optional first port transformer 45a and an optional second port transformer 45b have been added in order to improve performance by providing a high common mode impedance on the first and second ports 17, 18. The port transformers 45a, 45b can be replaced with common mode chokes as long as impedance transformation is not required. A further option is e.g. to replace the port transformer 45a, 45b with amplifiers with high common mode impedance.

FIG. 3 also illustrates a balanced connection towards the line, which would be the case with e.g. a twisted-pair cable. Here, a secondary center tap 13 is provided on the second transformer winding 11b, wherein the second centre tap 13 is connected to ground. In some cases different termination impedances can be used, but do not affect the impedance matching on the primary side.

The coupled inductor 32 creates a first-order low-pass filter for transmit and receive ports since at high frequencies, a larger part of the signal will fall over the coupled inductor 32. This can be useful to limit unwanted high-frequency radiation, e.g. from signal harmonics or clock spurs. Optional capacitors 40a, 40b are provided in order to tune the low-pass cutoff frequencies for transmission and reception, as well as the pass-band slope and the return loss as seen from the cable.

An optional third inductor 33c is arranged between the second terminal 20b of the first port 17 and the second terminal 21b of the second port 18. The third inductor forms part of the coupled inductor 32 along with the first inductor 33a and the second inductor 33b. The third inductor 33c is provided to tune down the mutual inductance of the coupled inductor 32. This is useful when the optimal value of the coupled inductor 32 is not available; a larger value can then be selected and tuned down by the third inductor 33c.

While the circuits of FIGS. 2 and 3 may appear complicated at first, the additional components are small and of low cost compared to the transformer 10, since high voltage isolation requirements are much lower. The coupled inductor 32 should have a mutual inductance close to the leakage inductance per winding in the transformer 10. Since good quality signal transformers have a leakage inductance of at most a few percent of the winding inductance, the coupled inductor 32 can be made very small, and thus inexpensive, compared with the transformer 10 (or a second transformer of a dual core hybrid coil).

Figure 4:
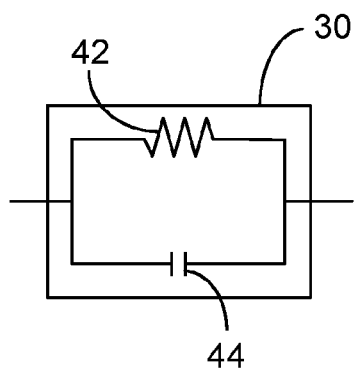
FIG. 4 is a schematic circuit diagram of an embodiment of the impedance matching device of FIGS. 2 and 3.

FIG. 4 is a schematic circuit diagram of an embodiment of the impedance matching device 30 of FIGS. 2 and 3. The impedance matching device comprises a resistor 42 and an optional capacitor 33 connected in parallel.

The capacitor, when provided, compensates for parasitic capacitance in the transformer 10.

Figure 5:
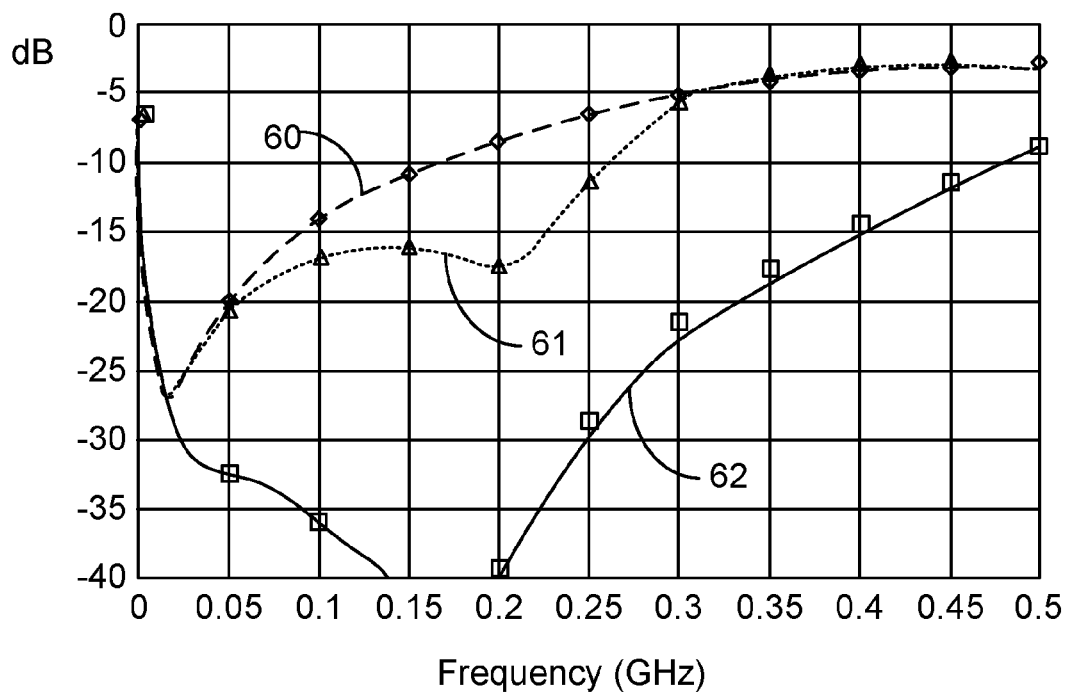
FIG. 5 is a schematic graph illustrating Trans-Hybrid Return Loss of various hybrid coil circuits.

FIG. 5 is a schematic graph illustrating Trans-Hybrid Return Loss (THRL) of various hybrid coil circuits. The horizontal axis represents frequency and the vertical axis represents decibel (dB). More negative values are better since those imply better cancellation.

A dashed line 60 represents THRL for the hybrid coil circuit of FIG. 1 where the impedance matching device is purely resistive. A dotted line 61 represents THRL for the hybrid coil circuit of FIG. 1 where the impedance matching device is complex. A solid line 62 represents THRL for the hybrid coil circuit of FIG. 2 where the impedance matching device is complex. It can be seen how much better the embodiment of FIG. 2 performs in relation to the prior art, and also how well it performs over a wide bandwidth.

Figure 6:
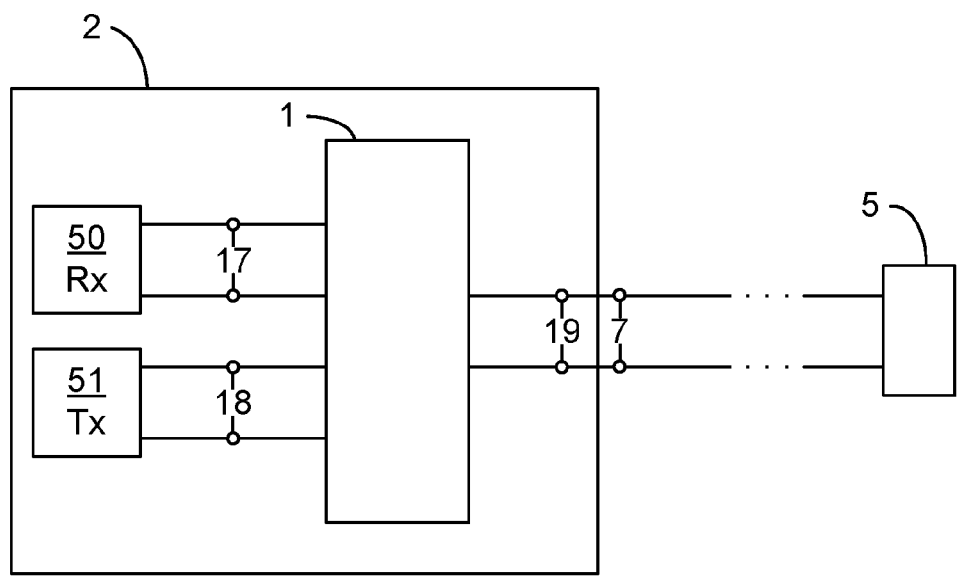
FIG. 6 is a schematic diagram illustrating a remote radio head comprising the hybrid coil circuit of FIG. 2 or 3.

FIG. 6 is a schematic diagram illustrating a remote radio head 2 comprising the hybrid coil circuit 1 of FIG. 2 or 3. The remote radio head 2 works as a radio interface for a network node (such as a base station) 5 of a cellular network. Several remote radio heads 2 can be connected to a single network node 5, allowing the coverage of a radio cell of the network node 5 to be customised. This can e.g. be particularly useful in indoor deployments.

A receiver 50 of the remote radio head 2 is then connected to the first port 17 of the hybrid coil circuit 1 and a transmitter 51 is connected to the second port of the hybrid coil circuit 1. The third port 19 of the hybrid coil circuit 1 is connected to a port 7 of the remote radio head 2 for connection to a network node 5.

Figure 7:
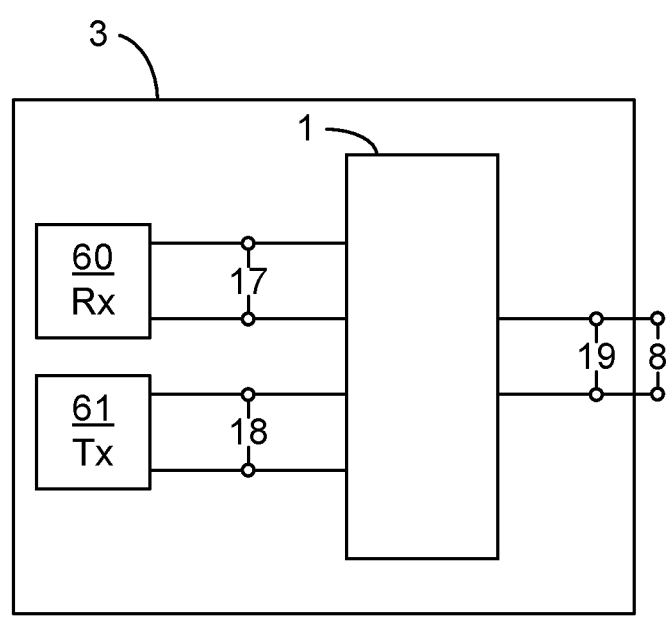
FIG. 7 is a schematic diagram illustrating a network interface comprising the hybrid coil circuit of FIG. 2 or 3.

FIG. 7 is a schematic diagram illustrating a network interface 3 comprising the hybrid coil circuit 1 of FIG. 2 or 3. The network interface 3 can e.g. be used for a Local Area Network (LAN) connection, such as 1000BASE-T (gigabit Ethernet) and/or 10 GBASE-T (10 gigabit Ethernet).

A receiver 60 of the network interface 3 is then connected to the first port 17 of the hybrid coil circuit 1 and a transmitter 61 is connected to the second port of the hybrid coil circuit 1. The third port 19 of the hybrid coil circuit 1 is connected to a port 8 of the network interface 3 for connection to a network.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A hybrid coil circuit comprising:
    a transformer comprising a first transformer winding and a second transformer winding, wherein a first centre tap is arranged on the first transformer winding;
    a common mode choke comprising a first choke winding connected on its first side to a first end of the first transformer winding, a second choke winding connected on its first side to the first centre tap and a third choke winding connected on its first side to a second end of the first transformer winding, wherein all choke windings are magnetically coupled;
    an impedance matching device connected on a first end to a second side of the second choke winding, the impedance matching device being connected to ground;
    a first terminal of a first port being provided connected to a second side of the first choke winding;
    a second terminal of the first port being provided connected to a second end of the impedance matching device;
    a first terminal of a second port being provided connected to a second side of the third choke winding;
    a second terminal of the second port being provided connected to a second end of the impedance matching device;
    a third port being provided with respective terminals connected to either end of the second transformer winding;
    a first inductor arranged between the second end of the impedance matching device and the second terminal of the first port; and
    a second inductor arranged between the second end of the impedance matching device and the second terminal of the second port, wherein the first inductor and the second inductor are magnetically coupled.

2. The hybrid coil circuit according to claim 1, wherein the magnetic coupling of the first inductor and second inductor comprises a first common magnetic core.

3. The hybrid coil circuit according to claim 1, wherein the magnetic coupling of all choke windings comprises a second common magnetic core.

4. The hybrid coil circuit according to claim 1, further comprising:
    a first capacitor arranged between the first inductor and the second side of the first choke winding; and
    a second capacitor arranged between the second inductor and the second side of the third choke winding.

5. The hybrid coil circuit according to claim 1, further comprising:
    a third inductor arranged between the second terminal of the first port and the second terminal of the second port.

6. The hybrid coil circuit according to claim 1, wherein the impedance matching device comprises a resistor in parallel with a capacitor.

7. The hybrid coil circuit according to claim 1, further comprising a first port transformer connected on the first port and a second port transformer connected on the second port.

8. The hybrid coil circuit according to claim 1, further comprising:
    a second centre tap is arranged on the second transformer winding, wherein the second centre tap is connected to ground.

9. A remote radio head comprising a hybrid coil circuit according to claim 1, wherein the hybrid coil circuit is arranged such that its third port is connected to a port of the remote radio head for connection to a network node, its first port is connected to a receiver of the remote radio head and its second port is connected to a transmitter of the remote radio head.

10. A network interface comprising a hybrid coil circuit according to claim 1, wherein the hybrid coil circuit is arranged such that its third port is connected to a network port of the network interface, its first port is connected to a receiver of the network interface and its second port is connected to a transmitter of the network interface.

* * * * *